C. BUNN.
ANIMAL TRAP.
APPLICATION FILED JULY 12, 1916.
1,246,539.
Patented Nov. 13, 1917.
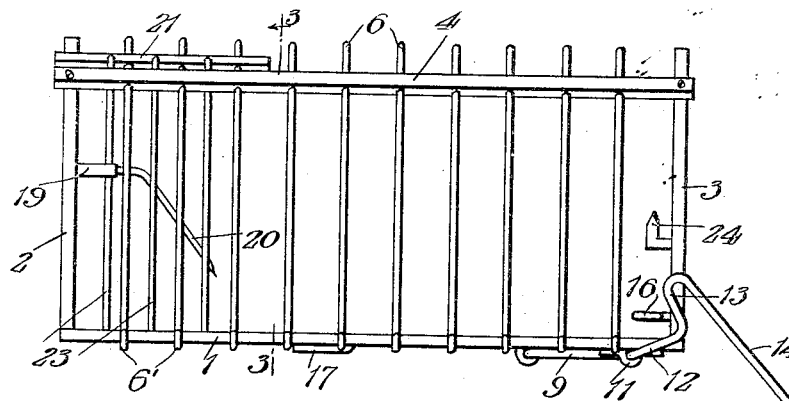
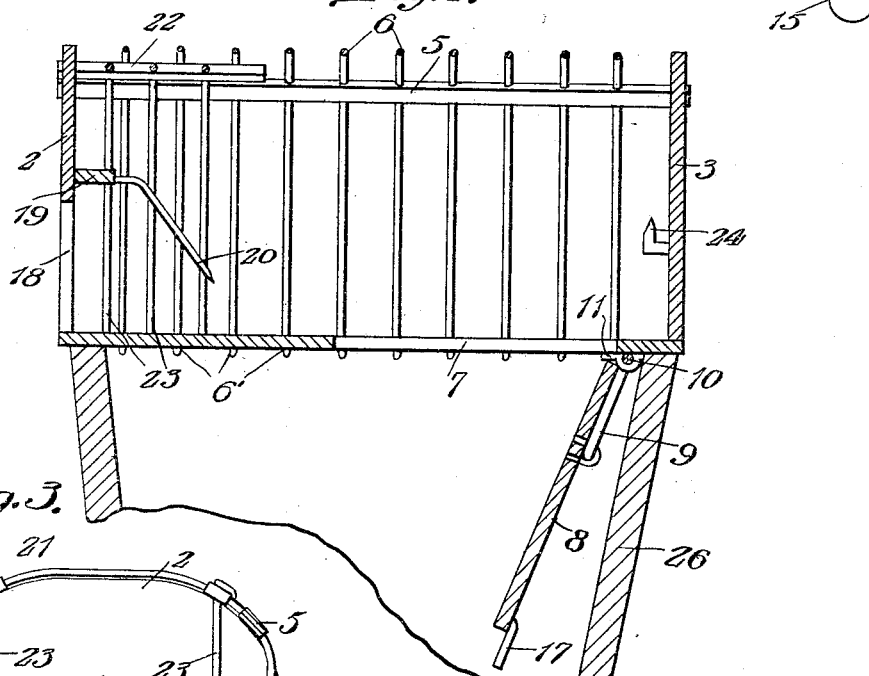
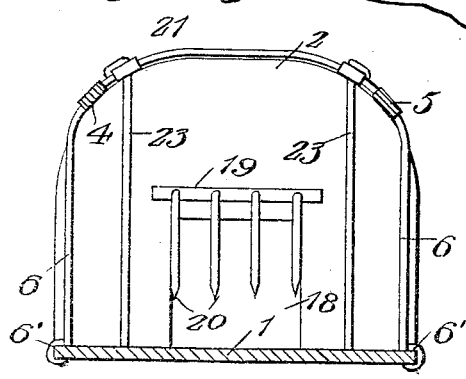
Carl Bunn,
Inventor
By Geo. P. Kimmel.
Attorney

UNITED STATES PATENT OFFICE.

CARL BUNN, OF FLINT, MICHIGAN.

ANIMAL-TRAP.

1,246,539.  Specification of Letters Patent.  Patented Nov. 13, 1917.

Application filed July 12, 1916.  Serial No. 108,850.

*To all whom it may concern:*

Be it known that I, CARL BUNN, a citizen of the United States, and resident of Flint, in the county of Genesee and State of Michigan, have invented certain new and useful Improvements in Animal-Traps, of which the following is a specification.

The present invention relates to the art of fishing and trapping and has particular reference to new and useful improvements in self-set and ever-set traps.

The primary object of my invention is to provide an animal trap of the class described which is simple in construction, strong and durable, cheap to manufacture and effective in operation.

Another object of my invention is to provide a trap of the class described having an improved arrangement of parts whereby the trap may be placed upon any type of receptacle containing liquid, an improved construction of trap door being provided whereby to drop an animal into the liquid contents of the receptacle when the animal enters the trap.

A further object of my invention is to provide a trap of the class described which after an operation, will automatically return to set position without attention.

Other objects and advantages to be derived from the use of my improved trap will appear from the following detail description and the claim, taken with an inspection of the accompanying drawing, in which:

Figure 1 is a side elevational view of a trap embodying the improvements of my invention;

Fig. 2 is a longitudinal sectional view of the trap, showing the same during an operation and in position on a receptacle; and Fig. 3 is a transverse vertical sectional view taken on the line 3—3 of Fig. 1 looking in the direction of the arrow.

Referring more particularly to the drawing, wherein similar characters of reference designate like and corresponding parts throughout the various views, 1 designates the base of my improved trap, and 2 and 3 designate the end walls thereof. The end walls 2 and 3 are connected by means of longitudinally extending bars 4 and 5, a plurality of wire rods or the like 6 being connected as at 6' to the base 1 and passing over the base and through said bars 4 and 5, forming the body of the trap.

The base 1 is provided with a rectangular opening 7 adjacent the rear end of the trap, a trap door 8 being adapted to close said opening, at times. The trap door 8 is mounted on the crank portion 9 of a shaft 10 mounted in bearings 11, the free end of the shaft being bent to form a substantially right-angular portion 12 formed with a loop 13, the same terminating in an arm 14 having a weight 15 on the free end thereof. A hook member 16 carried by the wall 3 is disposed in the path of movement of the right-angular portion 12 whereby to limit the downward movement of the trap door 8. A tongue member 17 carried by the free end of the door 8 engages the under surface of the base 1 and limits the upward movement of the door.

The wall 2 is provided with an opening 18 forming the entrance, a bar 19 being disposed transversely above said opening and carrying a plurality of inwardly and downwardly projecting tines 20. In order to direct an animal beneath the tines and into the trap I provide a pair of longitudinally extending bars 21 and 22 carried by the wall 2 and certain of the rods 6. A plurality of vertical rods 23 are connected with the base 1 and with said relatively short bars 21 and 22 forming sides adjacent the tines 20.

A bait hook 24 is carried by the wall 3 and serves to support bait for enticing the animal into the trap. The traps may be made of various sizes depending upon the class of animal which it is desired to capture. When the animal enters the trap the same is arranged in the position shown in Fig. 1. The animal passes beneath the tines 20 and is thereby prevented from leaving the trap. When the animal approaches the bait it must step upon the trap door 8, the trap door immediately giving way under the weight of the animal, allowing it to drop into the receptacle, in the present instance a barrel being shown and designated 26. The hook member 16 serves to limit the tripping of the trap door and the weight 15 serves to return the trap door to closed position ready for another actuation.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure, as do not depart from the spirit and scope of the invention as claimed.

Having thus fully described my invention, what I claim as new and desire to secure by Letters Patent, is:—

In a trap of the class described, a base, said base having an opening therein, wire rods arranged over said base and secured thereto to form the body of the trap, an inwardly extending guide passage at one end of said trap, a plurality of tines arranged therein, a rock shaft mounted in bearings adjacent one marginal edge of the base opening, a crank formed on said shaft, a trap door rigidly connected to the crank, a right angular portion on one end of said rock shaft, a weight on the free end of said portion to normally hold the trap door in operative position, a loop on said right angular portion, and a stop on the rear wall of the trap adapted to be engaged by said loop when the door is operated to limit the swinging movement thereof.

In testimony whereof, I affix my signature hereto.

CARL BUNN.

Copies of this patent may be obtained for five cents each, by addressing the "Commissioner of Patents, Washington, D. C."